No. 783,665. PATENTED FEB. 28, 1905.
P. V. AVRIL.
FINDER FOR PHOTOGRAPHIC INSTRUMENTS.
APPLICATION FILED MAR. 28, 1904.

WITNESSES:
J. E. Pearson
Mark O'Connor

INVENTOR
Paul Victor Avril
BY Geo. H. Benjamin
ATTORNEY

No. 783,665. Patented February 28, 1905.

UNITED STATES PATENT OFFICE.

PAUL VICTOR AVRIL, OF PARIS, FRANCE.

FINDER FOR PHOTOGRAPHIC INSTRUMENTS.

SPECIFICATION forming part of Letters Patent No. 783,665, dated February 28, 1905.

Application filed March 26, 1904. Serial No. 200,212.

*To all whom it may concern:*

Be it known that I, PAUL VICTOR AVRIL, a citizen of the Republic of France, residing at Paris, France, have invented certain new and useful Improvements in Finders for Photographic Instruments, of which the following is a specification.

My invention relates to a device adapted to be used in connection with a photographic instrument, and which has for its object to serve as a finder or otherwise as a means for defining the image to be photographed.

Heretofore finders have consisted of a small mirror mounted in or on a photographic apparatus. Such mirrors, owing to their small size, liability to be affected by shadows, &c., are unsatisfactory and difficult to use. In order to overcome the objections to the use of such finders, I have devised the finder which I will now describe.

Figure 1:
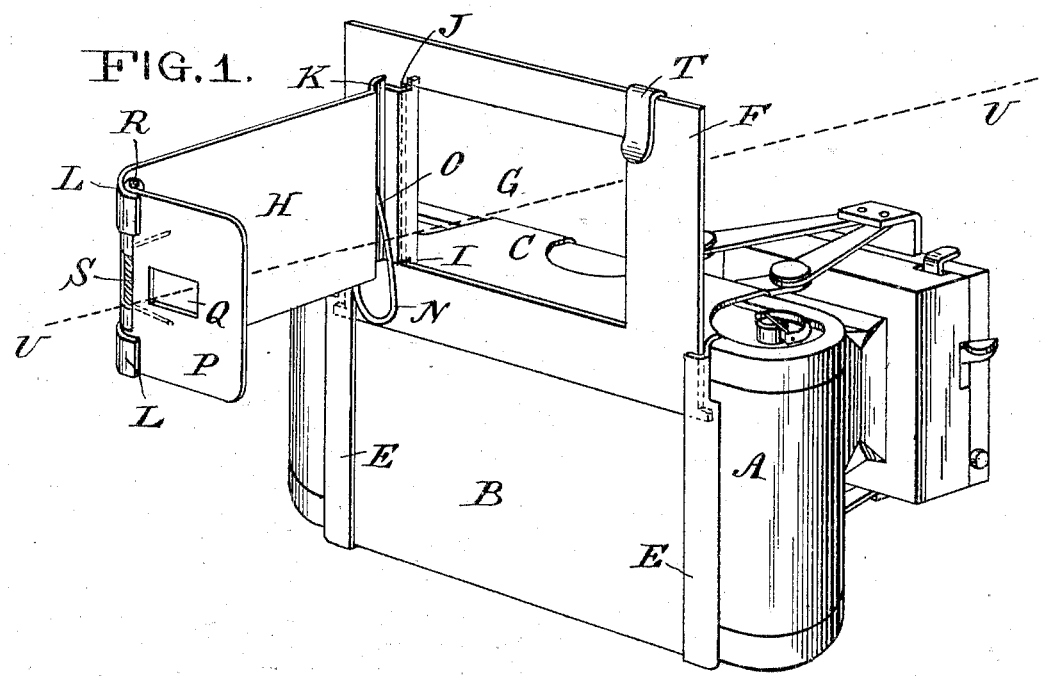
Figure 4:
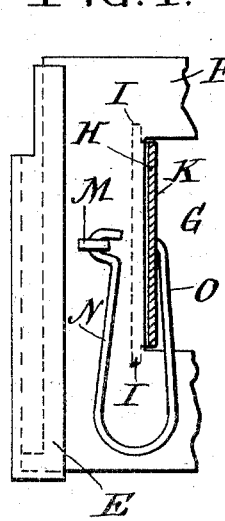
Figure 2:
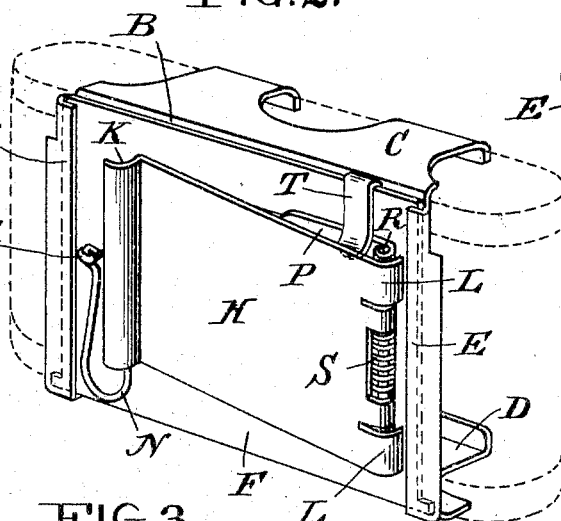
Figure 5:
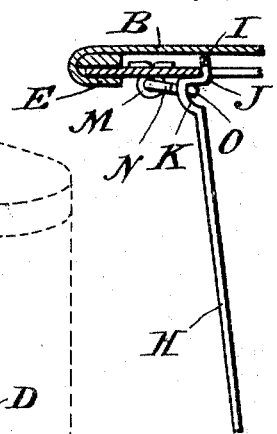
Figure 3:
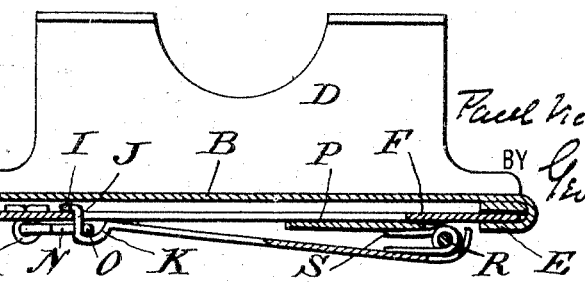

Figure 1 is a perspective view of a camera of the "kodak" type, which is shown extended with my improved finder mounted upon the back and in a position for use. Fig. 2 is a similar view with the finder in the closed position. Fig. 3 is a plan view and longitudinal section taken through the finder and removed from the camera. Fig. 4 is an elevation of the support and vertical section through the finder and is intended to illustrate the means for connecting the finder to its support. Fig. 5 is a horizontal section taken through the support, with a plan view of one plate of the finder its spring, &c.

Referring to the drawings, A represents a camera, that shown being of the construction known as the "kodak." Secured to the back of the camera is a detachable support. This support is formed of the back portion B and top and bottom portions C D, which parts overlie the back and top and bottom of the camera and serve to secure such support to the camera. The construction is such, it will be observed, that the support may be readily slid off of the camera. Secured to the back portion B of the support are the plates E, situated slightly above the back portion B, so as to form recesses between the inner sides of such plates and such back portion. Manifestly the described support is applicable only to a camera having the shape of that shown in the drawings. For other forms of camera—such, for instance, as the box or square type—any suitable form of support may be used.

Instead of using a detachable support the means for holding the finder may form a part of the camera itself. This will be sufficiently obvious without further description.

Mounted in the support and arranged to be movable therein, so as to occupy two positions, (respectively shown in Figs. 1 and 2,) is the finder. The finder consists of a plate F, movable in its support and having a central opening G. The plate F and the opening G are shown as substantially rectangular. They may, however, be of any shape. Carried by the plate F is a plate H, the inner end of which is provided with upwardly and downwardly extending projections I, which are introduced into the opening G at one side and bear upon the rear side of the plate F. This plate H is bent at its end to the left and then circularly forward to the right, as indicated at J and K. The forward end of the plate is curved to the right, as shown at L. Connected to the plate F through a staple M is a spring N, one end of which coacts with the staple. The other end O of the spring is bent upwardly and lies in the cavity of the circular portion K of the plate H. This spring forms a simple and convenient means for holding the plate H in the open position.

I do not in any wise limit myself to the construction of the plate H, its mode of attachment to the plate F, or to the construction of the spring for holding it open. Any means of attachment and any spring device may be used.

Hinged to the forward end of the plate H is a second plate P, having an opening Q. This opening may be substantially rectangular, as shown, or of other shape, but preferably the shape of the openings G and Q should correspond. The plate P is hinged on the plate H at R, and a helical spring S is used to hold the plate P, when the plates H and P are open, in the open position—*i. e.*, in the position shown in Fig. 1.

The width of the top, bottom, and sides of the plates F and P should be such as to thoroughly isolate the object sighted through the openings G Q from its surroundings.

Situated on the front of the plate F, on its right-hand side, is a hook T, which serves to hold the plates H and P in the closed position. Any other suitable device may be used for the purpose.

In the construction shown to close and secure the plates P and H the plate P is first folded upon the plate H, then both plates turned toward the plate F and as they approach the plate F pushed downward, so that the upper edge of the plate H will move under the hook T, as indicated in Fig. 2. The shape of the plate H at its rear end permits this movement.

The construction of the device as a whole is one which I find convenient in use; but I do not limit myself in any wise to the particular features of construction as described, as it is obvious that many changes may be made therein without departing from the intent of my invention.

The line of vision in finding a picture is indicated by the dotted line U. It will at once be seen that when the eye of the operator is placed in front of the opening Q in the plate P the picture defined will have the diameter of the opening G in the plate F.

Having thus described my invention, I claim—

1. A self-contained finder for photographic instruments, comprising two plates having openings therein differing in size, and with their tops, bottoms and sides of sufficient width to isolate the object sighted from its surroundings, a third plate interposed between said plates and hinged thereto, and a resilient means for maintaining said plates in the open position.

2. A self-contained finder for photographic instruments, comprising two plates having openings therein differing in size, with their tops, bottoms and sides of sufficient width to isolate the object sighted from its surroundings, a third plate hinged to said first-named plates, and means for holding said plates in substantially parallel relation when in the closed position.

3. A self-contained finder for photographic instruments, comprising a supporting-plate, means for detachably connecting said plate to a photographic instrument, two plates having openings therein differing in size and with their tops, bottoms and sides of sufficient width to isolate the object sighted from its surroundings, means for defining the distance between said plates when in the open position and for holding said plates in substantially parallel relation when in the closed position.

4. A self-contained finder for photographic instruments, comprising a supporting-plate, means for detachably connecting said plate to a photographic instrument, an image-defining plate movable in said supporting-plate and having an opening therein, a distance-plate hinged to said second-named plate, and a sighting-plate having an opening therein and hinged to said third-named plate, means for holding the second and fourth named plates parallel when open, and means for holding all of the plates substantially parallel when closed.

5. A self-contained finder for photographic instruments, comprising a plate having an opening therein, a second plate having an opening therein of smaller size, a plate interposed between the two which fixes the distance between the first and second named plates when the finder is in the open position, means for holding the first and second named plates in parallel relation when the finder is open, and means for holding all of the plates in substantially parallel relation when the finder is closed.

6. A self-contained finder for photographic instruments, comprising a support, a plate movable in said support and having an opening therein of definite size, a plate having a hinged connection to said first-named plate, and a third plate hinged to said second-named plate and having an opening therein corresponding to but differing in size from the opening in the first-named plate.

7. A self-contained finder for photographic instruments, comprising a plate having an opening therein, a second plate having projections on the rear end thereof adapted to bear on the rear of said first-named plate, a third plate hinged to the second-named plate and having an opening therein corresponding to but differing in size from the opening in the first-named plate, and a spring device interposed between the first and second named plates.

8. A self-contained finder for photographic instruments, comprising a plate having an opening therein, a second plate having projections on the rear end thereof adapted to bear on the rear of said first-named plate, a third plate hinged to the second-named plate and having an opening therein corresponding to but differing in size from the opening in the first-named plate, a spring device interposed between the first and second named plates, and a spring device interposed between the second and third named plates.

9. A folding pocket-finder, comprising three hinged plates, one of them provided with a large-size opening, another with a small-size opening, and the third adapted to define the distance between the first and second named plates when the finder is open, together with means for holding the plates in substantially parallel relation when the finder is closed.

In testimony whereof I affix my signature in the presence of two witnesses.

PAUL VICTOR AVRIL.

Witnesses:
J. E. PEARSON,
FRANK O'CONNOR.